July 16, 1940.  R. W. BROWN  2,208,536
APPARATUS FOR THE MANUFACTURE OF RUBBER PLATES
Filed April 20, 1936   5 Sheets-Sheet 2

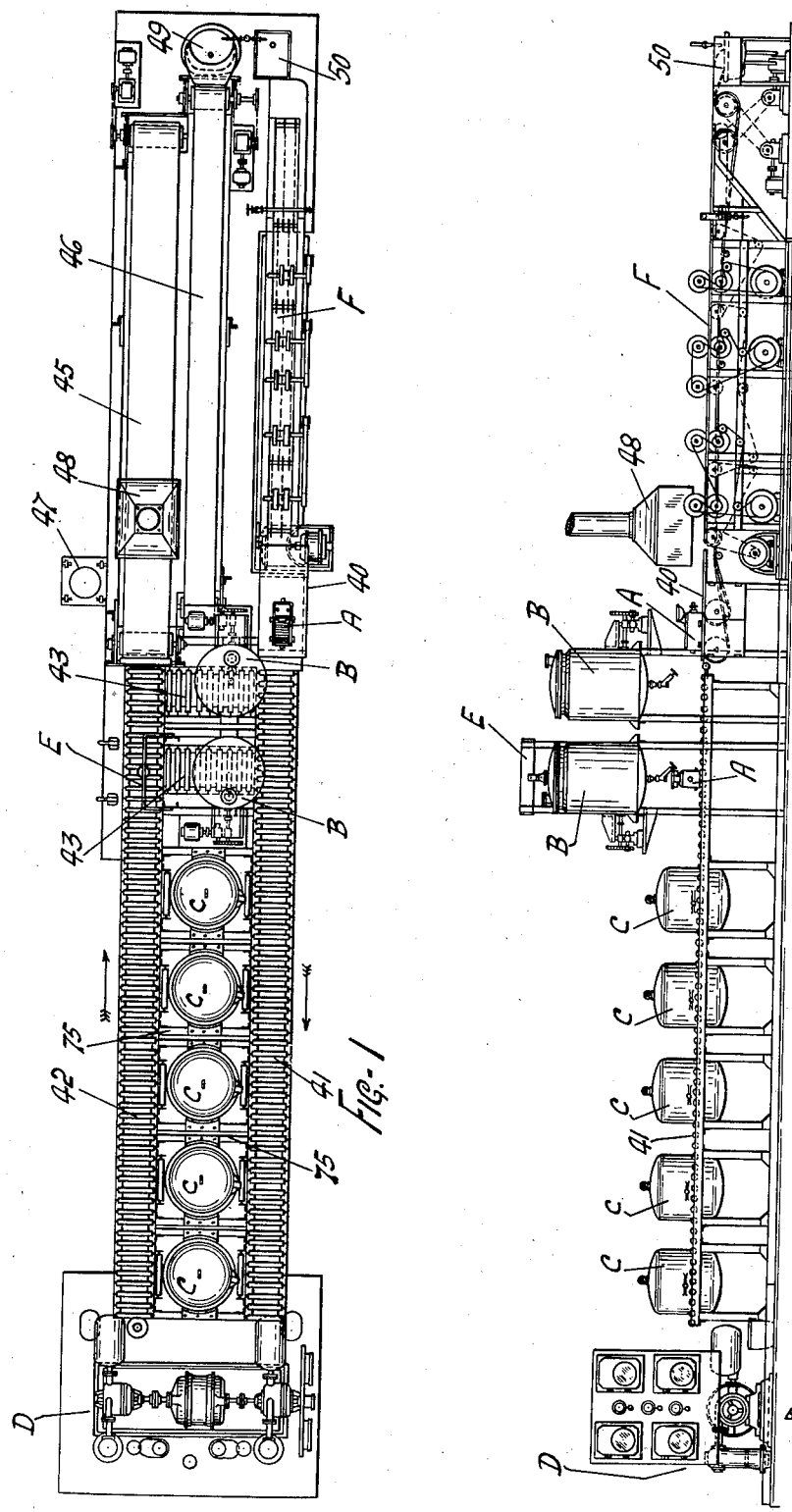

INVENTOR
Roy W. Brown
BY Albert L. Ely
ATTORNEY

July 16, 1940.  R. W. BROWN  2,208,536
APPARATUS FOR THE MANUFACTURE OF RUBBER PLATES
Filed April 20, 1936  5 Sheets-Sheet 3
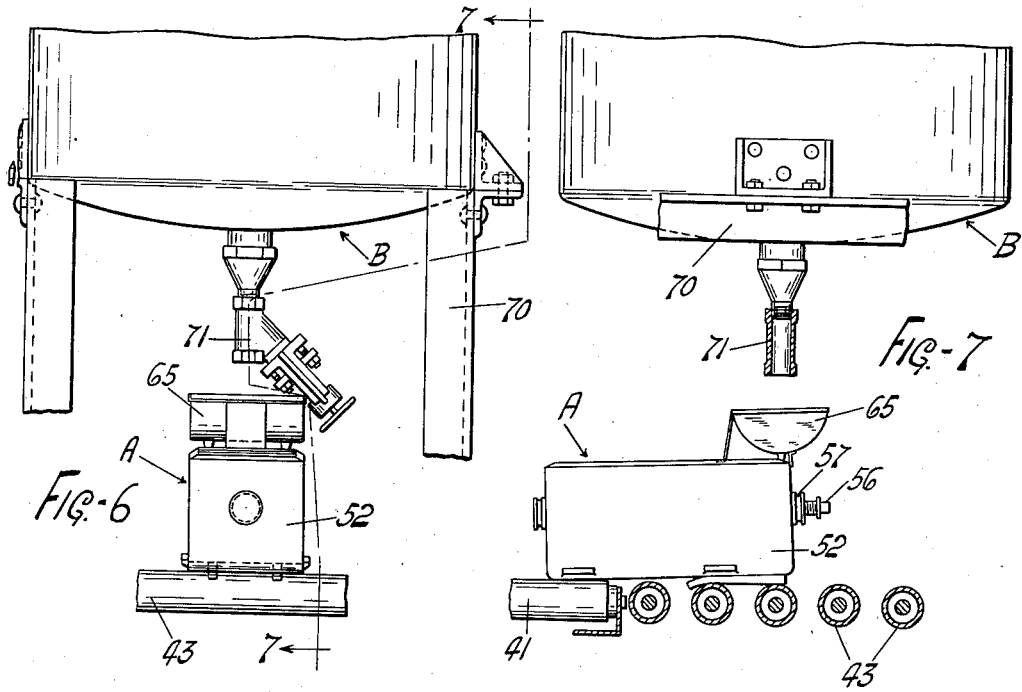
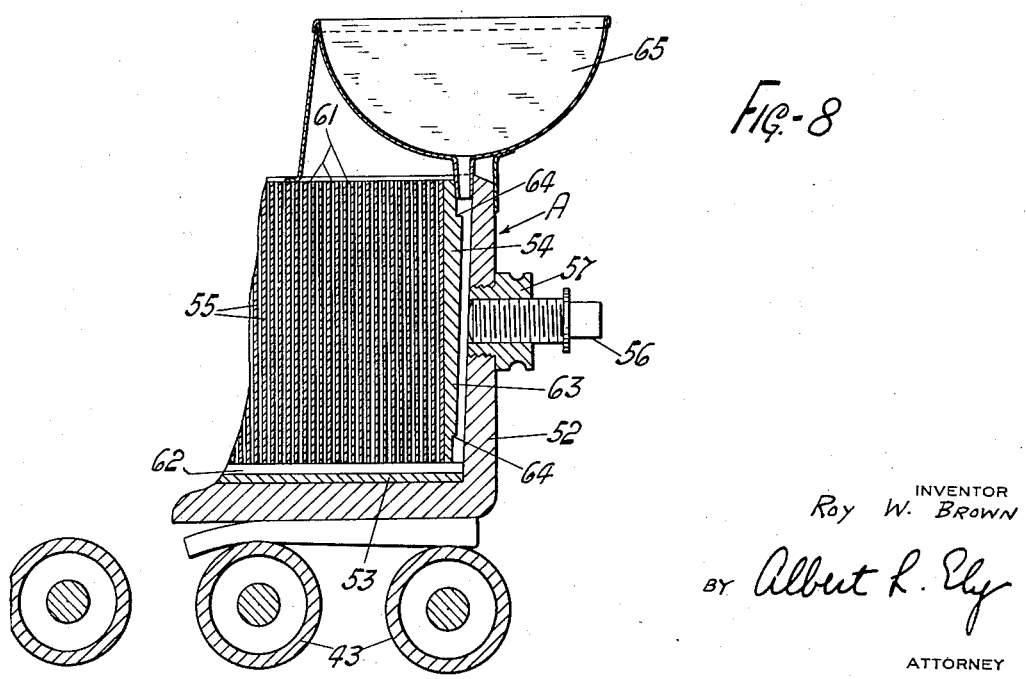
INVENTOR
Roy W. Brown
BY Albert R. Ely
ATTORNEY

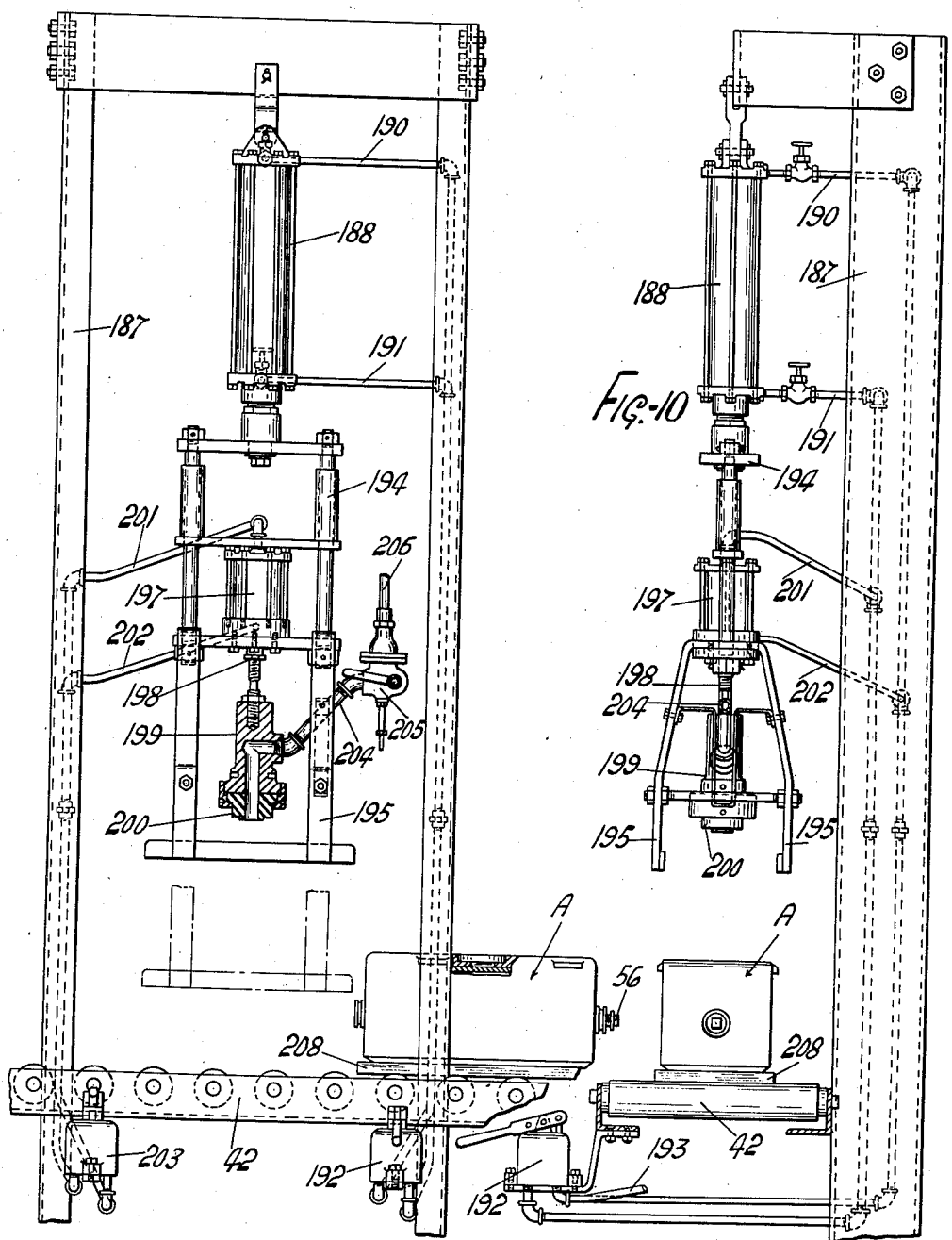

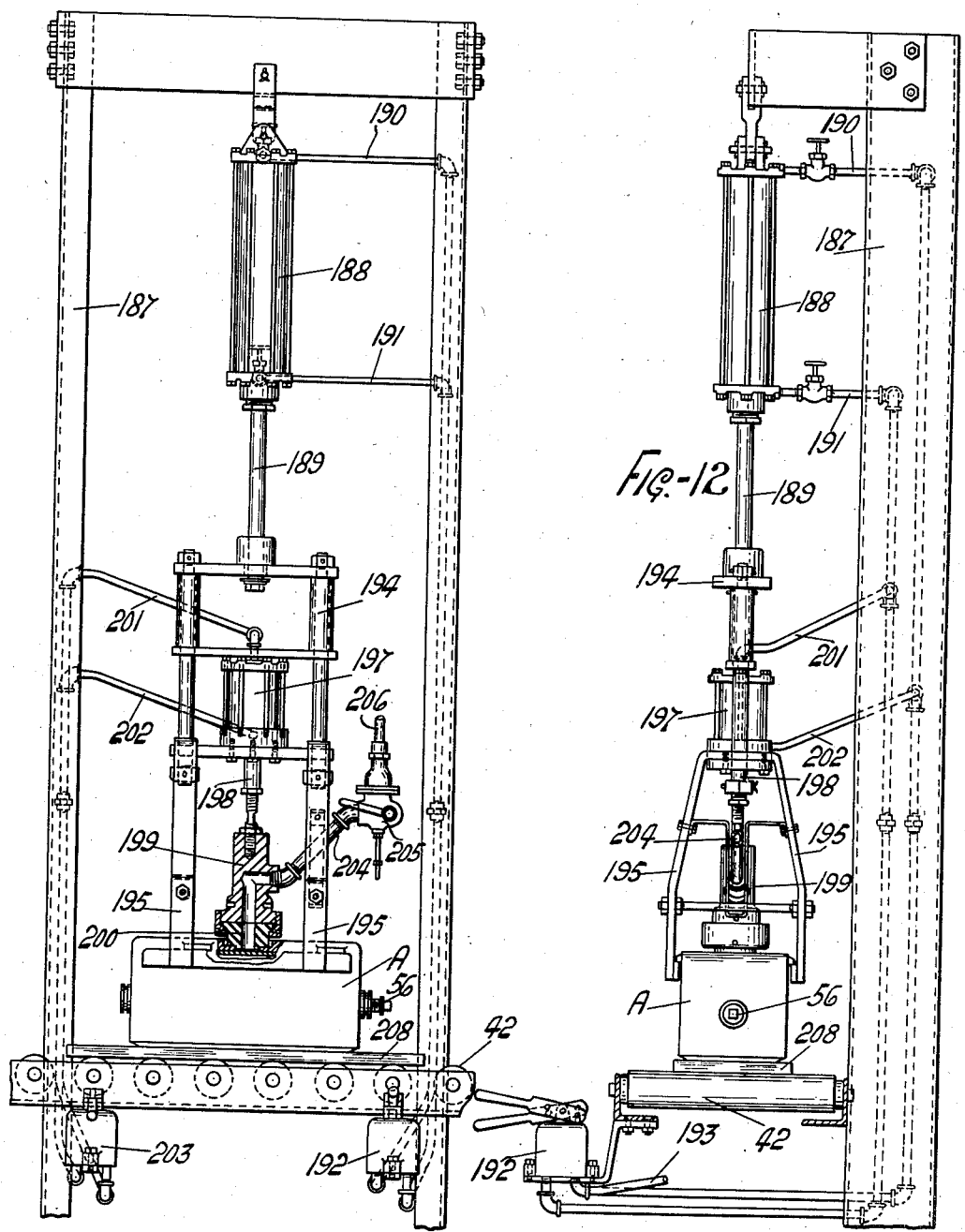

Patented July 16, 1940

2,208,536

UNITED STATES PATENT OFFICE 2,208,536

APPARATUS FOR THE MANUFACTURE OF RUBBER PLATES

Roy W. Brown, Akron, Ohio, assignor to The Firestone Tire & Rubber Company, Akron, Ohio, a corporation of Ohio Application April 20, 1936, Serial No. 75,273

3 Claims. (Cl. 18—39)

This invention relates to methods of and apparatus for the manufacture of rubber plates, and more especially it relates to procedure and apparatus for making relatively thin plates or sheets of relatively stiff rubber composition.

The invention is of primary utility in the manufacture of storage battery separator plates of relatively stiff, microporous rubber wherein the latter is produced directly from rubber latex. The product, the composition from which it is made, and the laboratory method of manufacture are clearly set out in the patent to H. W. Greenup, No. 1,959,160, of May 15, 1934. In some of its aspects the present invention is an improvement over the invention of Greenup aforesaid, and it comprises apparatus and supplemental steps of procedure whereby the articles may be produced, economically in quantity, for the trade.

The chief objects of the invention are to provide improved procedure and simple, efficient and durable apparatus for making rubber plates of the character mentioned. More specific objects are to provide for relatively large production without an excessive amount of apparatus; to reduce costs; to avoid the production of defective articles; to produce articles of attractive and uniform appearance; to effect uniformity of structure in the articles, and to conserve floor space. Other objects will be manifest.

Of the accompanying drawings:

Figure 1 is a plan view of apparatus embodying and adapted to carry out the invention, in its preferred form;

Figure 2 is a plan view thereof;

Figure 6 is a front elevational view showing the position of a mold during the filling thereof;

Figure 7 is a side elevation thereof as viewed from line 7—7 of Figure 6;

Figure 8 is a sectional view of one end portion of a mold, and a filling attachment that is associated therewith during the mold-filling operation;

Figure 9 is a front elevation of apparatus for ejecting finished work from a mold in inoperative position, a part being in section;

Figure 10 is a side elevation of the apparatus shown in Figure 9, as viewed from the right thereof, one of the valves being omitted for clearness of illustration;

Figure 11 is a view similar to Figure 9 showing the apparatus in operative position;

Figure 12 is a side elevation of the structure shown in Figure 11.

*General description*

Figure 3:
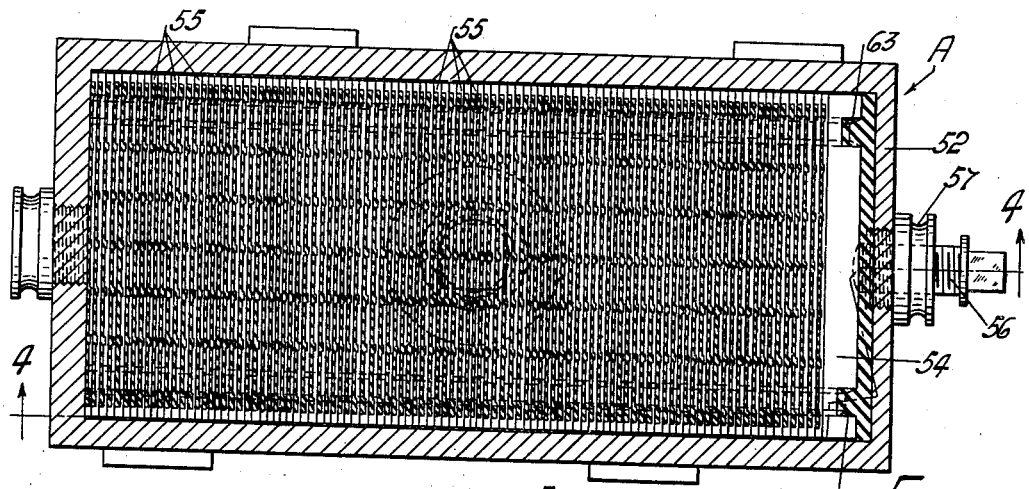
Figure 3 is a sectional view of a mold assembly taken on the line 3—3 of Figure 4.

Referring particularly to Figures 1 and 2 of the drawings, there is shown, somewhat diagrammatically, a layout of the apparatus embodying the invention and employed in carrying out the improved method of manufacturing relatively stiff storage battery separator plates from rubber latex. The essential elements of the apparatus consist of molds A, a pair of latex storage and dispensing tanks B, B, a battery of vulcanizers or autoclaves C, C, fluid-control apparatus D for providing vulcanizing fluid to the vulcanizers, work-ejecting mechanism E for removing the finished work from the molds A, and apparatus, generally designated F, for cleaning the partition plates of the molds between successive vulcanizing operations.

The molds A are assembled upon a table 40 that is positioned on the front side of the apparatus (the near side as viewed in Figures 1 and 2) adjacent the latex tanks B. A roller conveyor 41 extends along the front of the apparatus from the table 40 to the farthest vulcanizer C, to facilitate the moving of the molds from the table 40 to either tank B, where the molds are loaded, and thence to any one of the vulcanizers C. A similar roller conveyor 42 extends along the rear of the apparatus to receive the molds as they are removed from the vulcanizers, and to facilitate the moving of the molds, to the right as viewed in Figures 1 and 2, to a position beneath the work-ejecting mechanism E, the latter being positioned over conveyor 42. Short roller conveyors 43, 43 extend from conveyor 41 to conveyor 42, beneath the respective latex tanks B.

In continuation of the roller conveyor 42 at the right-hand end thereof, is an endless belt conveyor 45, and extending parallel to the latter, between it and the mold-plate cleaning apparatus F is an endless conveyor belt 46. Beside belt conveyor 45, near the end of roller conveyor 42, is a mobile tank 47 of cleaning fluid. An operator standing beside said tank 47 receives the work as it is ejected from a mold, separates the pieces of work from the mold plates, dips the pieces of work in the tank 47 and then places them on conveyor 45, and places the mold plates on conveyor 46. A suction hood 48 is positioned over conveyor 45 to remove noxious odors arising from the work. The conveyor 45 moves slowly and the work thereon dries, said work being manually removed from the conveyor at the right-hand end thereof. At the delivery end of conveyor 46 is a receptacle or sink 49 that receives the mold plates from the conveyor 46. The mold plates are manually washed in receptacle 49 and rinsed in a receptacle or sink 50 positioned beside it. The receptacle 50 is positioned at one end of plate cleaning device F, so that the mold plates may be removed from said receptacle 50 and placed directly upon the said cleaning device F. The delivery end of the latter is beside mold-assembling table 40.

The latex tanks

The latex storage and dispensing tanks B are two in number to provide continuity of operation. Thus one of the tanks may be in use filling molds while the other is empty or being filled with a fresh charge of latex. The latex is compounded at a point removed from the apparatus, and comprises the usual or preferred constituents for effecting vulcanization in the presence of heat and pressure. A suitable example of the composition may be found in the Greenup patent aforementioned.

Each tank B is supported at an elevated position upon a framework 70, and at its bottom is provided with a valved delivery spout 71 from which a small stream of the latex may be delivered to a mold positioned therebeneath.

The molds

The particular type of mold A employed in the invention is shown in detail in Figures 3, 4, 5 and 8. It comprises a rectangular metal box 52 having a removable bottom plate 53, a removable end plate 54 in one end thereof, and a plurality of metal molding plates 55, 55 positionable within the box upon the bottom plate 53 therein. The plates 55 are arranged to stand on edge, in face to face relation, between the end plate 54 and the opposite end of the box, and to have slight clearance with the respective sides of the box. The plates 55 are compacted within the box 52 by means of a tightening screw 56 that is threaded through a bushing 57 that is mounted in the end-wall of the box, behind the end plate 54. The latter tapers toward its bottom margin, and the adjacent end-wall of the box is complementally sloped, the arrangement being such as to provide a draft for facilitating the removal of the work and the plates 55 from the box. There is an aperture 58 in the bottom of the box, which aperture normally is closed by a threaded closure member or plug 59.

Each plate 55 is recessed in one lateral face as shown, so that the laterally abutting plates define intervening molding cavities 61, 61, Figure 8, the latter being open at the top, and closed at the bottom by bottom plate 53. The molding cavities in the plates 55 are arranged to be filled with rubber latex that enters said cavities from the bottom thereof, and to this end the top face of the bottom plate 53 is formed with two parallel grooves 62, 62 extending from end to end thereof. In that face of end plate 54 that abuts the end of box 52 there is formed two spaced-apart vertical grooves 63, 63, and intersecting, transverse grooves 64, 64 that are contiguous with the top and bottom margins of the said plate. The upper groove 64 serves the purpose of receiving the nozzle of a removable trough-like filling attachment 65, Figures 6, 7 and 8 in the operation of filling the mold with latex.

Figure 4:
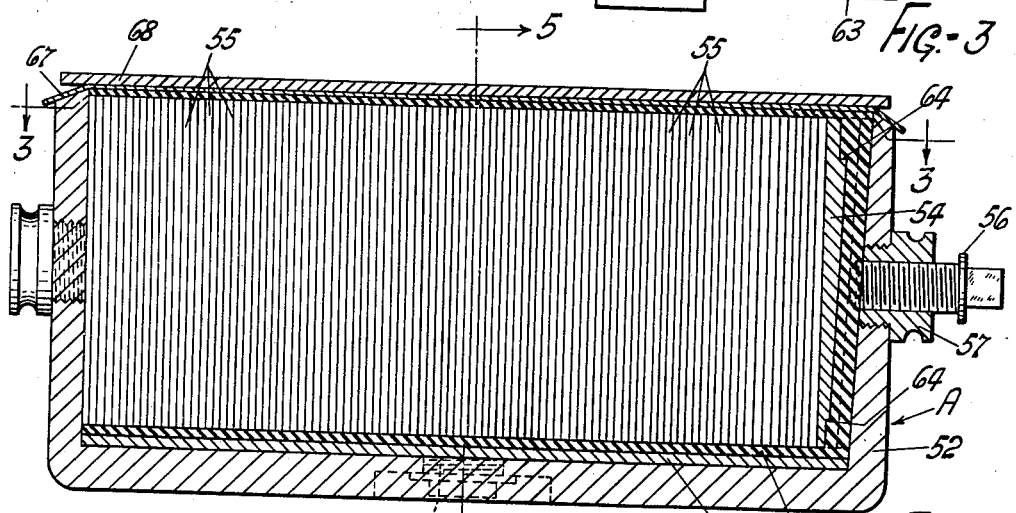
Figure 4 is a vertical section through a mold assembly taken on the line 4—4 of Figure 3.
Figure 5:
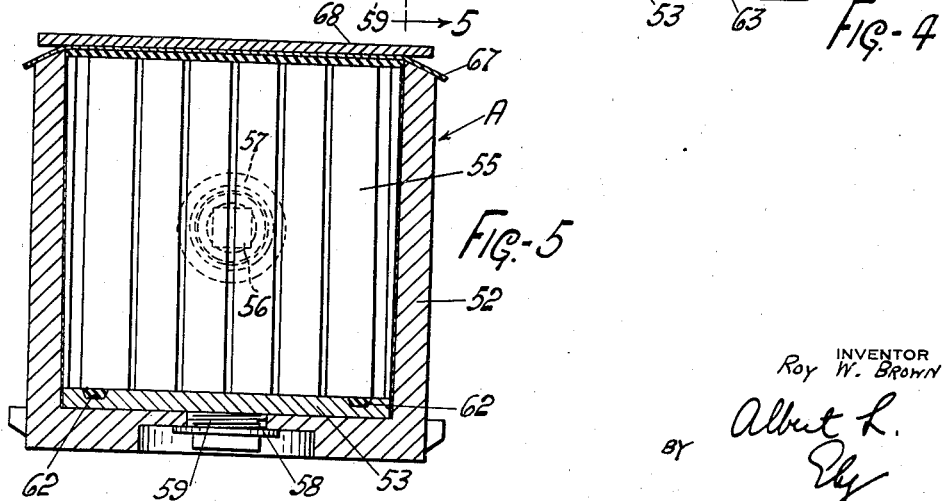
Figure 5 is a section on the line 5—5 of Figure 4.

The mold is filled with latex while the plates 55 are in un-compacted condition, as shown in Figures 3 and 8, said latex flowing through the grooves 63 and 64 of end plate 54 and grooves 62 of bottom plate 53, and then rising from the latter into molding cavities 61 between plates 55, with the result that there is little or no entrapped air in the mold. The latex in the filled mold preferably is agitated, as by tapping the mold with a hammer, to cause any bubbles in the latex to rise to the top. Thereafter the plates 55 are compacted, as shown in Figure 4, by setting up the screw 56.

The mold is provided with a cover of heavy duck or canvas 67 and a metal cover plate 68, the canvas cover 67 resting upon the upper margin of the box 52, directly above the latex therein, and being held in place by cover plate 68. Both are applied just before the mold is placed in a vulcanizer C. The function of the canvas cover 67 is to absorb moisture of condensation that occurs when steam in the vulcanizer comes into contact with the cold mold. In the absence of cover 67, such condensate might blemish the work or cause non-uniformity of its structure.

The work-ejecting mechanism

The work-ejecting mechanism is shown in detail in Figures 12 to 15 inclusive to which attention now is directed. Said mechanism comprises a framework 187 that overhangs the roller conveyor 42, and suspended from said framework is a double-acting fluid pressure operated cylinder 188, the piston rod 189 of which extends downwardly. The respective ends of cylinder 188 are connected to inlet-and-outlet fluid-conducting pipes 190, 191 that extend to a manually-operated 4-way operating valve 192, the latter being connected to a fluid supply pipe 193. Swivelled on the lower end of piston rod 189 is a yoke 194, and extending downwardly from the latter is a pair of brackets 195, 195 adapted to straddle a mold A and engage under suitable lugs projected laterally from the sidewalls of the mold, near the bottom thereof, as shown in Figures 14 and 15, during the operation of the ejector.

Mounted upon the yoke 194 is a vertically arranged, double acting fluid pressure operated cylinder 197, the piston rod 198 of which projects downwardly and has an axially apertured nozzle 199 mounted upon its lower end, the lower end of said nozzle being provided with an annular nose or gasket 200 of resilient material such as rubber. Fluid for operating the cylinder 197 is conducted to the respective ends thereof through flexible fluid conductor pipes 201, 202 that have connection with a suitable manually operated control valve 203. The axial aperture in the nozzle 199 and gasket 200 constitute a delivery orifice for hydraulic pressure. Water is delivered thereto through a short pipe 204 projecting from the nozzle and carrying a manually operable valve 205, the latter having connection with a suitable source of hydraulic pressure through a flexible supply pipe 206.

The mold A as it comes from the vulcanizer has a heavy layer of vulcanized rubber over the tops of the mold plates 55 and this requires to be scraped therefrom. Thereafter the mold is inverted upon a board 208, the tightening screw 56 is loosened, and the closure plug 59 is removed before the mold is advanced to the work-ejecting station.

The mold A on the board 208 is advanced endwise to the work-ejecting station while the lower end of the cylinder 197 is charged and supports the nozzle 199 in raised position, and the upper end of the cylinder 188 is charged so that the brackets 195 are in the lowered position indicated by the broken lines in Figure 12. Thus the mold may be moved between the said brackets 195 and they will engage under the lugs projecting laterally from the mold. Then the fluid pressure in the cylinder 197 is reversed so that nozzle 199 is lowered until gasket 200 on the lower end thereof engages the bottom of the mold about the aperture 58 therein. Valve 205 is then operated to deliver hydraulic pressure through the nozzle 199, said pressure being applied, through the aperture 58 in the mold bottom, against the bottom plate 53 in the mold. Fluid pressure in the cylinder 188 is then reversed to lift the brackets 195 to the position shown in full lines in Figure 12 with the result that the mold box 52 is lifted therewith and the bottom plate 53, end plate 54, mold plates 55, and the work in the mold are ejected therefrom by the hydraulic pressure upon said bottom plate. Valve 205 is then operated to shut off the hydraulic pressure, and cylinder 197 is reversed to move the nozzle 199 out of engagement with the bottom of the mold.

Overflow vulcanized rubber composition is then scraped from the sides and top of the ejected assembly, bottom plate 53 and end plate 54 are removed therefrom, and the molded structure consisting of the work and mold plates 55 is moved along to the end of roller conveyor 42 and onto endless conveyor 45. The latter may be moved intermittently if desired. Thereafter the cylinder 188 is reversed to lower the brackets 195 and mold box carried thereby. The mold box is then moved out of engagement with said brackets, and plug 59 re-threaded into aperture 58, after which the box is inverted to restore it to normal position, and bottom plate 53 and end plate 54 are replaced therein. The box is then moved to the opposite side of the apparatus by means of one of the roller conveyors 43.

An operator separates the mold plates 55 from the hard rubber sheets between adjacent plates, the latter then being placed upon endless conveyor 46 and conveyed to the receptacle or sink 49 at the delivery end thereof. The molded work is washed in the tank 47 and then placed on the conveyor 45, beneath the hood 48, which draws off the noxious fumes arising from the work. Subsequently the molded work is moved to the delivery end of conveyor 45 and manually removed therefrom for further treatment.

Modification may be resorted to without departing from the spirit of the invention or the scope of the appended claims, which are not limited to the specific construction shown or exact procedure described.

What is claimed is:

1. Vulcanizing apparatus comprising a mold comprising a box, a removable bottom plate therein, said bottom plate being formed with one or more grooves in its top face extending from end to end thereof, a removable end plate in the box, and a plurality of removable, vertically arranged plates in the box defining vertical intermediate molding cavities, said end plate being formed with means permitting fluent vulcanizable material to flow between it and the adjacent wall of the box, whereby said material may reach the bottom plate and flow through the grooves therein and enter the molding cavities from the bottom thereof.

2. A combination as defined in claim 1 including means for moving the end plate laterally to effect a compacting of the plates in the box.

3. In apparatus of the character described, a mold comprising a box, a removable bottom plate therein, said bottom plate being formed in its top face with one or more grooves extending from end to end thereof, a removable end plate at one end of the box and resting on said bottom plate, the adjacent faces of the end plate and end wall of the box being complementally tapered to facilitate removal of the end plate, a plurality of removable, vertically arranged separator plates in the box defining intermediate molding cavities, said end plate being formed with one or more vertical grooves to permit fluent vulcanizable material to pass between the end plate and mold wall and to reach the grooves of the bottom plate so as to flow through the latter and enter the molding cavities from the bottom thereof, and a screw threaded through the end wall of the mold into engagement with the end plate for compacting the separator plates in the box, said box being formed with a closable port in the bottom thereof through which fluid pressure may be introduced to eject the contents of the box after the vulcanizable material therein has been vulcanized.

ROY W. BROWN.